Jan. 12, 1954 N. E. KLEIN 2,666,188
PLANETARY MOVEMENT
Filed Aug. 25, 1944
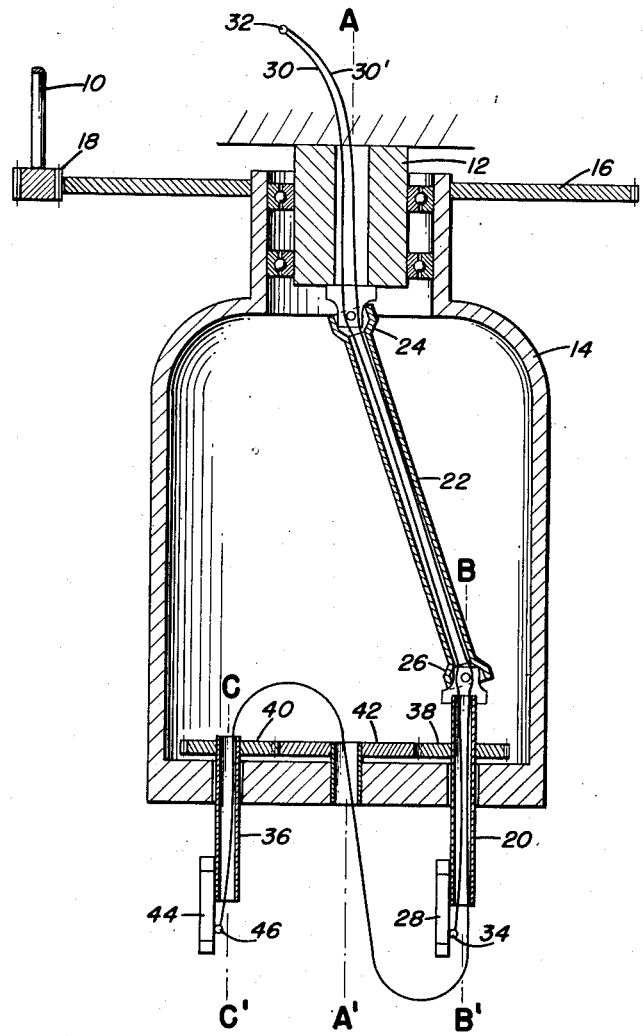
INVENTOR
NORMAN E. KLEIN
BY
ATTORNEYS Patented Jan. 12, 1954

2,666,188

UNITED STATES PATENT OFFICE 2,666,188

PLANETARY MOVEMENT

Norman E. Klein, Garden City, N. Y.

Application August 25, 1944, Serial No. 551,236

4 Claims. (Cl. 339—5)

This invention relates to planetary movements for translating an element in a circular path without altering the space orientation thereof, and more particularly to planetary movements for this purpose so arranged that electrical connections may be made between a fixed reference point and the translated element without the use of slip rings or other sliding electrical contacts.

It is usual, when it is desired to translate an element in a circular path without altering its space orientation, to cause such element motion by means of planetary movements. Such movements often take the form of gear trains by means of which a support for the element is rotated about an axis normal to the plane of the circular path at the center thereof, and a system of back gearing driven from that axis whereby the element is rotated in respect to the support to maintain the space orientation of the element constant.

Planetary movements of the general type referred to above are useful in many applications, but are not completely satisfactory when the supported element is an electrical device, as for example a magnetic pickup coil or the like. In such cases, previously known planetary movements require the use of slip rings or other connections involving sliding contacts. Corrosion, dirt and surface irregularities cause variations in the electrical resistance between such sliding contacts, thereby introducing undesirable electrical "noise."

There is provided in accordance with the present invention, therefore, a planetary mechanism operable in response to an external drive for translating an element in a circular path without altering the space orientation thereof, this mechanism comprising a fixed mounting structure, a hollow case rotatable in respect thereto by the external drive, an element-supporting shaft journaled in the case for rotation about an axis parallel to the rotational axis thereof and spaced from that axis by a distance equal to the radius of the desired translation circle, and a flexible linkage connecting the mounting structure to the element-supporting shaft and arranged to prevent axial rotation of that shaft.

Also in accordance with the invention, mechanism is provided whereby more than one element may be supported individually and caused to describe the desired motion.

In the accompanying drawing there is shown, partly in section, a planetary mechanism in accordance with the invention.

In the embodiment of the invention shown in the drawing, the mechanism is arranged to produce translation of one or more elements in a circle about axis AA' in response to an external rotational drive applied through shaft 10, the translation of the elements being accomplished without altering the space orientation thereof. Accordingly, there is provided a supporting structure 12 in respect to which a hollow case 14 is mounted for rotation about axis AA'. A spur gear 16 secured to case 14 engages spur gear 18 on shaft 10, permitting rotation of the case by an external drive. An element-supporting shaft 20 is journaled in case 14 for rotation about axis BB' parallel to axis AA' and spaced therefrom by a distance equal to the radius of the desired circle of translation.

A flexible linkage, in this case comprising a link 22 and universal couplings 24 and 26, connects supporting structure 12 to the upper end of shaft 20. It will be understood that other flexible linkage, as for example any well-known flexible shafting, may be utilized in place of the linkage described, the only requirement being that the flexible linkage prevent axial rotation of shaft 20 as it is translated about axis AA' by rotation of case 14.

A consideration of the device just described indicates that as case 14 is rotated, shaft 20 is translated in a circular path without axial rotation, although relative rotation of the shaft and the case occur. Accordingly, electrical connections to a pickup coil 28 or other electrical device mounted on shaft 20 may be made without the use of slip rings or sliding contacts. For this purpose, link 22 and shaft 20 may be made hollow and a cable 30 passed therethrough. Connections may thus be made between a fixed external terminal 32 and terminal 34 on coil 28. Since shaft 20 does not rotate about its axis during its translation about axis AA', there is no tendency for cable 30 to twist or wind up, and it is necessary only that the cable be flexible enough to withstand the motions introduced by the universal couplings as the translation of shaft 20 occurs.

If it is desired to cause translation of a pair of elements in a circular path about the same axis without rotation thereof, additional mechanism shown in the drawing may be provided. For this purpose, a second element-supporting shaft 36 is journaled in case 14 for rotation about axis CC', parallel to axis AA' and spaced therefrom by a distance equal to the radius of the translation circle. Means are provided for preventing axial rotation of shaft 36 as case 14 rotates, such means conveniently taking the form of spur gears 38 and 40 of equal pitch diameter mounted respectively on shafts 20 and 36, and an idler gear 42 of the same pitch diameter journaled for rotation in respect to case 14 about axis AA' and engaging spur gears 38 and 40.

A consideration of the gear train just described will indicate that as case 14 rotates, relative rotation between the case and shaft 36 is produced by the gear train, this rotation being such that the space orientation of an element supported thereby is maintained constant. As case 14 rotates, gear 38, being rotationally fixed, causes rotation of idler gear 42 in respect to the case. Because of the arrangement of the parts, the rotation of idler gear 42 serves to prevent rotation of gear 40 by case 14 as the latter revolves about its axis.

If it is desired to support a second electrical device, as for example a pickup coil 44, on shaft 36, electrical connections may be made to this device also without the use of slip rings. Thus, the shaft upon which idler gear 42 is journaled is made hollow, as is shaft 36. A second cable 30' may be connected to terminal 32 and passed through link 22, shaft 20 and through the hollow shaft of idler gear 42 and shaft 36 to terminal 46 on the second pickup coil.

It will be understood that additional elements may be individually supported for translation in the same circular path by similar construction, the arrangement utilized in the mechanism shown in the drawing in the case of shaft 36 being reproduced in each case.

What is believed to be new and useful is:

1. A planetary mechanism for translatory movement of an element along a circular path comprising a fixed mounting structure, a hollow case rotatably connected at one end to said mounting structure for rotation about a central axis, a drive means located externally of and operatively connected to said hollow case to rotate it relative to said fixed mounting structure, an element-supporting shaft journalled in the other end of said hollow case for rotation about an axis parallel to the central axis and spaced radially outwardly therefrom a distance equal to the radius of the desired translational path, a tortionally rigid elongated member located within said case, and a pair of connections securing the opposite ends of said member to said mounting structure and to said element-supporting shaft respectively and arranged to restrain said member against rotation relative to either said mounting structure or said element-supporting shaft, whereby said shaft and an element supported thereby are moved along a circular path around the central axis without being rotated relative to said mounting structure.

2. A device as described in claim 1, in which said element-supporting shaft and said member are hollow tubes and, in addition, a unitary conduit extending through said member and said shaft and fixedly fastened at one end within said mounting structure and at the other end to an element supported by said element-supporting shaft externally of said hollow case.

3. A device as described in claim 1, including, in addition, at least one other element-supporting shaft journalled in said other end of said hollow case for rotation about an axis parallel to the axis of rotation of said first mentioned element-supporting shaft and to the central axis, and means mounted upon said hollow casing interconnecting said element-supporting shafts and arranged to restrain said other element-supporting shaft against rotation relative to said mounting structure.

4. A device as described in claim 1, including, in addition, at least one other element-supporting shaft journalled in said other end of said hollow case for rotation about an axis parallel to the axis of rotation of said first mentioned element-supporting shaft and to the central axis and gear means mounted upon the respective element-supporting shafts and interconnected to restrain said other element-supporting shaft against rotation relative to said mounting structure.

NORMAN E. KLEIN.

References Cited in the file of this patent

UNITED STATES PATENTS

| Number | Name | Date |
|---|---|---|
| 398,664 | Sleeper | Feb. 26, 1889 |
| 1,147,896 | Schroeder | July 27, 1915 |
| 1,617,427 | Wegman et al. | Feb. 15, 1927 |
| 1,623,732 | Jacobs | Apr. 5, 1927 |
| 1,784,105 | Nigro et al. | Dec. 9, 1930 |
| 2,090,810 | Russell | Aug. 24, 1937 |
| 2,135,835 | Papello | Nov. 8, 1938 |
| 2,147,065 | Somerville | Feb. 14, 1939 |

FOREIGN PATENTS

| Number | Country | Date |
|---|---|---|
| 79,351 | Sweden | of 1930 |
| 620,670 | France | Apr. 27, 1927 |